(12) United States Patent
Saika et al.

(10) Patent No.: US 7,240,043 B2
(45) Date of Patent: Jul. 3, 2007

(54) METHOD OF CONTROLLING STORAGE CONTROL APPARATUS, STORAGE CONTROL APPARATUS, AND COMPUTER READABLE PROGRAM FOR CONTROLLING THE SAME

(75) Inventors: Nobuyuki Saika, Yokohama (JP); Homare Kanie, Yokohama (JP); Akira Kawashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 683 days.

(21) Appl. No.: 10/229,028

(22) Filed: Aug. 28, 2002

(65) Prior Publication Data

US 2003/0225898 A1  Dec. 4, 2003

(30) Foreign Application Priority Data

May 28, 2002  (JP) ............................. 2002-154083

(51) Int. Cl.
  *G06F 15/173* (2006.01)
(52) U.S. Cl. .................. 706/226; 709/225; 709/229; 710/74; 718/102
(58) Field of Classification Search ................ 709/225, 709/226, 229; 710/74; 718/102
  See application file for complete search history.

(56) References Cited

U.S. PATENT DOCUMENTS

| | | | |
|---|---|---|---|
| 5,887,134 A * | 3/1999 | Ebrahim .................... 709/200 |
| 6,324,581 B1 * | 11/2001 | Xu et al. .................... 709/229 |
| 6,425,051 B1 * | 7/2002 | Burton et al. ............... 711/113 |
| 6,557,079 B1 * | 4/2003 | Mason et al. ............... 711/137 |
| 6,598,129 B2 * | 7/2003 | Kanda et al. ............... 711/147 |
| 6,658,520 B1 * | 12/2003 | Bennett ..................... 710/312 |
| 6,779,063 B2 * | 8/2004 | Yamamoto .................. 710/74 |
| 6,857,012 B2 * | 2/2005 | Sim et al. ................... 709/222 |
| 2003/0188070 A1 * | 10/2003 | Delaney .................... 710/305 |

FOREIGN PATENT DOCUMENTS

JP  02-304647  12/1990
JP  06-250903  9/1994

OTHER PUBLICATIONS

Translation of "Notice of Reason for Rejection", Issued by Japan Patent Office, Feb. 13, 2007 in corresponding Japanese Patent Application No. 2002-148810, one page.

* cited by examiner

*Primary Examiner*—Saleh Najjar
*Assistant Examiner*—Liang-che Alex Wang
(74) *Attorney, Agent, or Firm*—Mattingly, Stanger, Malur & Brundidge, P.C.

(57) ABSTRACT

A method of controlling a storage control apparatus connected to a host computer via communication unit, receiving a data I/O request transmitted from the host computer, and performing a data I/O process corresponding to the request, includes the following steps of: transmitting a message notifying a start of a process from the storage control apparatus to the host computer when the storage control apparatus executes a process which requires control of a data I/O request transmitted from the host computer, and executing the process by the storage control apparatus after receiving a reply message in response to the aforementioned message.

10 Claims, 4 Drawing Sheets

| VOLUME ID | HOST COMPUTER ID | PORT ID |
|---|---|---|
| — | — | — |
| Vol 0112 | Server 0009 | 30020 |
| Vol 0113 | Server 0003 | 30050 |
| Vol 0114 | Server 0013 | 30030 |
| — | — | — |

METHOD OF CONTROLLING STORAGE CONTROL APPARATUS, STORAGE CONTROL APPARATUS, AND COMPUTER READABLE PROGRAM FOR CONTROLLING THE SAME

BACKGROUND OF THE INVENTION

The present invention relates to method of controlling a storage control apparatus, a storage control apparatus, and a computer program for controlling the apparatus.

With development of the information technology, demand for storage control apparatuses such as a disc array apparatus has been increased. In such a situation, recently, as a storage control apparatus of directly-connected-type to network such as LAN (local area network), there is known a storage control apparatus of so co-called NAS (network attached storage) type having a file system such as NFS (network file system) for accepting a data I/O request with file name specification from a host computer.

By the way, the file system mounted on the NAS performs communication with a host computer connected to the NAS in a so-called stateless system. Here, the stateless system of communication means a system performed by apparatuses not recognizing the processing state of the communication mates each other. That is, when communication is performed between the NAS and the host computer in the stateless system, the NAS does not grasp the processing of the host computer and the host computer does not grasp the operation of the NAS. The NAS and the host computer only accepts and executes, at the acceptance timing, a processing of a message and command transmitted from the communication mates.

It should be noted that as a specific example performing a stateless communication, for example, there is a communication between an Internet web server and a web client accessing it performed in accordance with the HTML protocol.

SUMMARY OF THE INVENTION

A storage control apparatus operating in a data center or the like performs not only real time service to a host computer but also data backup and batch processing for data extraction to a data ware house, which requires performing processing with a data I/O request stopped.

However, as has been described above, the NAS performs communication with the host computer in stateless manner. When the NAS starts backup and batch processing at its will, there is a possibility that a data I/O request interrupts from the host computer during the processing. When such an interrupt is caused, for example, in a data backup process, backup is fetched while data updating is not completed (for example, one record of the database has not been updated), and the backup content (for example, a record content) and a time stamp cannot be guaranteed. As for the batch processing, the data state is changed during the processing and the processing result may be affected.

For this reason, conventionally, before starting a backup or batch processing, an operator manually should perform setting so that no data I/O is caused from the host computers to the storage control apparatus.

It is therefore an object of the present invention to provide a method of controlling a storage control apparatus, a storage control apparatus, and a computer program capable of automatically controlling a data I/O request from a host computer when executing a processing in the storage control apparatus which requires stop of a data I/O request from the host computer.

In order to achieve the object, the main feature of the present invention is a method of controlling a storage control apparatus that connection is made with a host computer via communication unit, a data I/O request transmitted from the host computer is received, and a data I/O processing corresponding to the request is executed to the storage device connected. When the storage control apparatus performs a process which requires control of a data I/O request transmitted from the host computer, the storage control apparatus transmits a message notifying the host computer that the process is started, and the storage control apparatus starts the process after receiving a reply message in response to the aforementioned message.

Other objects, features and advantages of the invention will become apparent from the following description of the embodiments of the invention taken in conjunction with the accompanying drawings.

DESCRIPTION OF THE EMBODIMENTS

<Content of Disclosure>

Figure 1:
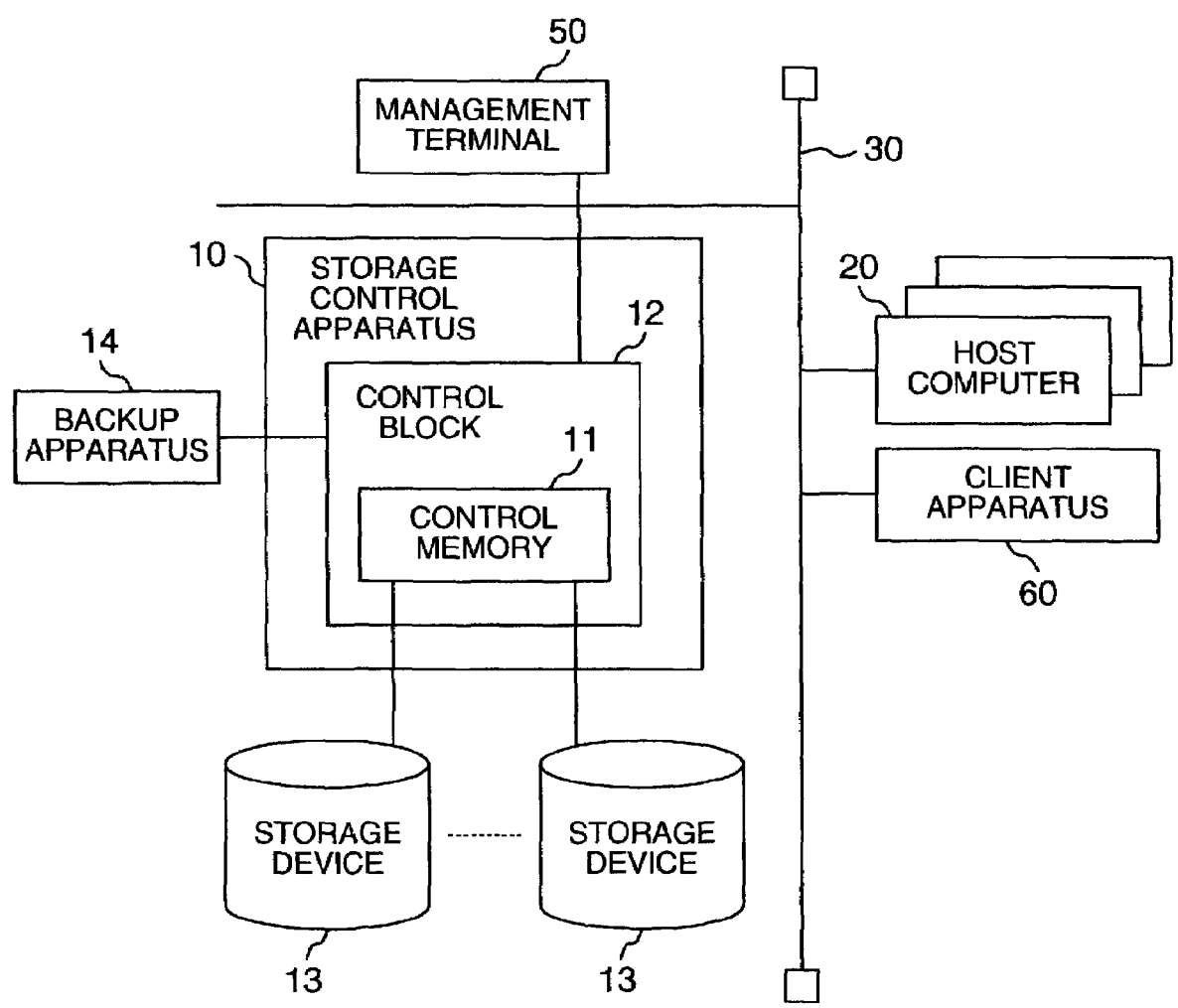
FIG. 1 shows a brief configuration of a storage system according to an embodiment of the present invention.

At least the following is made clear by the disclosure given below.

A method of controlling a storage control apparatus connected to a host computer via communication unit, receiving a data I/O request transmitted from the host computer, and executing a data I/O processing corresponding to the request to a storage device connected. When the storage control apparatus executes a process which requires the data I/O request transmitted from the host computer, the storage control apparatus transmits a message notifying the host computer that the process is to be started and executes the process after receiving a reply message in response to the aforementioned message.

Here, the communication unit is, for example, LAN or SAN (storage area network). The data I/O request is, for example, a data write in request or a data read out request. The storage control apparatus is, for example, a disc array apparatus. The storage control apparatus may include a built-in disc drive or an externally attached disc drive. The aforementioned process is, for example, a backup process for backup of data stored in a storage device such as a disc drive subjected to the data I/O processing of the storage control apparatus or a batch processing for data extraction to a data ware house.

Thus, when the storage control apparatus performs a process which requires control of the data I/O request transmitted from the host computer, the storage control apparatus transmits (calls back) a message notifying the host computer that the process is to be started, and performs the process after receiving a reply message in response to the aforementioned message. Accordingly, for example, when the aforementioned process is a backup process stored in a storage device, there is no danger of backup fetch while the data update is not completed, not guaranteeing the content of the backup data (such as a content of a record) and a time stamp. When the aforementioned process is a batch process, there is no danger of data state change during its processing, affecting the processing result. That is, it is possible to automatically control a data I/O request from the host computer. It should be noted that upon completion of the aforementioned process, the storage control apparatus may transmit a corresponding message to the host computer.

The data I/O request is transmitted to the storage control apparatus from the host computer in the so-called stateless communication system, i.e., the storage control apparatus cannot grasp at which timing the data I/O request is transmitted. Moreover, the control of the data I/O request transmitted from the host computer is that the host computer does not transmit the data I/O request to the storage control apparatus. Moreover, the reply message is a message notifying that the data I/O request is not transmitted to the storage control apparatus from the host computer. Moreover, the reply message includes that a data I/O processing performed for the data I/O request is set into a commit state.

Moreover, the storage control apparatus includes a file system and the data I/O request is a request instructing a data I/O on file basis. The file system is, for example, NFS. In this case, the data I/O request is an NFS command.

Moreover, the storage control apparatus contains information identifying the host computer as a destination of the message notifying the execution start and the message notifying the execution start is transmitted to a plurality of computers corresponding to this information. That is, a single storage control apparatus is utilized by a plurality of host computers.

<System Configuration>

FIG. 1 shows a brief configuration of a storage system according to an embodiment of the present invention. A storage control apparatus 10 is connected via LAN 30 to a host computer 20. The storage control apparatus 10 is connected to a management terminal 50 via communication unit such as the LAN 30. An operator operates the management terminal 50 to control the storage control apparatus 10 and set various parameters.

The host computer 20 is, for example, a personal computer, work station, a mainframe, and the like. On the host computer 20, an OS (operating system) and an application program are operating and in accordance with a request from these software, a data I/O request is transmitted from the host computer 20 to the storage control apparatus 10.

The storage control apparatus 10 constitutes a control block 12 having a CPU (not depicted), a control memory 11, a LAN connection interface, a disc controller, and the like, and a storage device 13 constituted of a disc drive or the like. It should be noted that the storage device 13 may be operated by the RAID (redundant array of inexpensive disks) manner. The storage control apparatus 10 is a disc array apparatus and is the aforementioned NAS. In the storage control apparatus 10, NFS is operating as a file system. It should be noted that the storage control apparatus 10 is connected to a backup device 14 such as a cartridge tape device.

The storage control apparatus 10 receives a data I/O request from the host computer 20 and executes a data I/O processing to the storage device 13 in accordance with the received request. Here, the I/O request transmitted from the host computer 20 is processed by the NFS. Accordingly, communication between the storage control apparatus 10 and the host computer 20 is performed in the condition that the storage control apparatus 10 cannot grasp at which timing a data I/O request is transmitted from the host computer 10. That is, the communication between the storage control apparatus 10 and the host computer 20 depends on a stateless communication system.

On the storage control apparatus 10, a job scheduler is operating. In this scheduler, processes which should be executed while stopping a data I/O request from the host computer 20 are scheduled such as backup of data stored in the storage device 13 and batch processing for data extraction to the data ware house. Accordingly, upon execution of such a process, the storage control apparatus 10 notifies the host computer 20 that the process is to be started and executes the process after receiving a response to this notification.

Hereinafter, as a specific example of this organization, explanation will be given on a case a process related to backup is scheduled and the process is executed. It should be noted that the backup here means saving or storing a program and data stored in a storage device in the backup device 14 against destruction and loss caused by various troubles.

<Flow of Backup Process>

Figure 2:
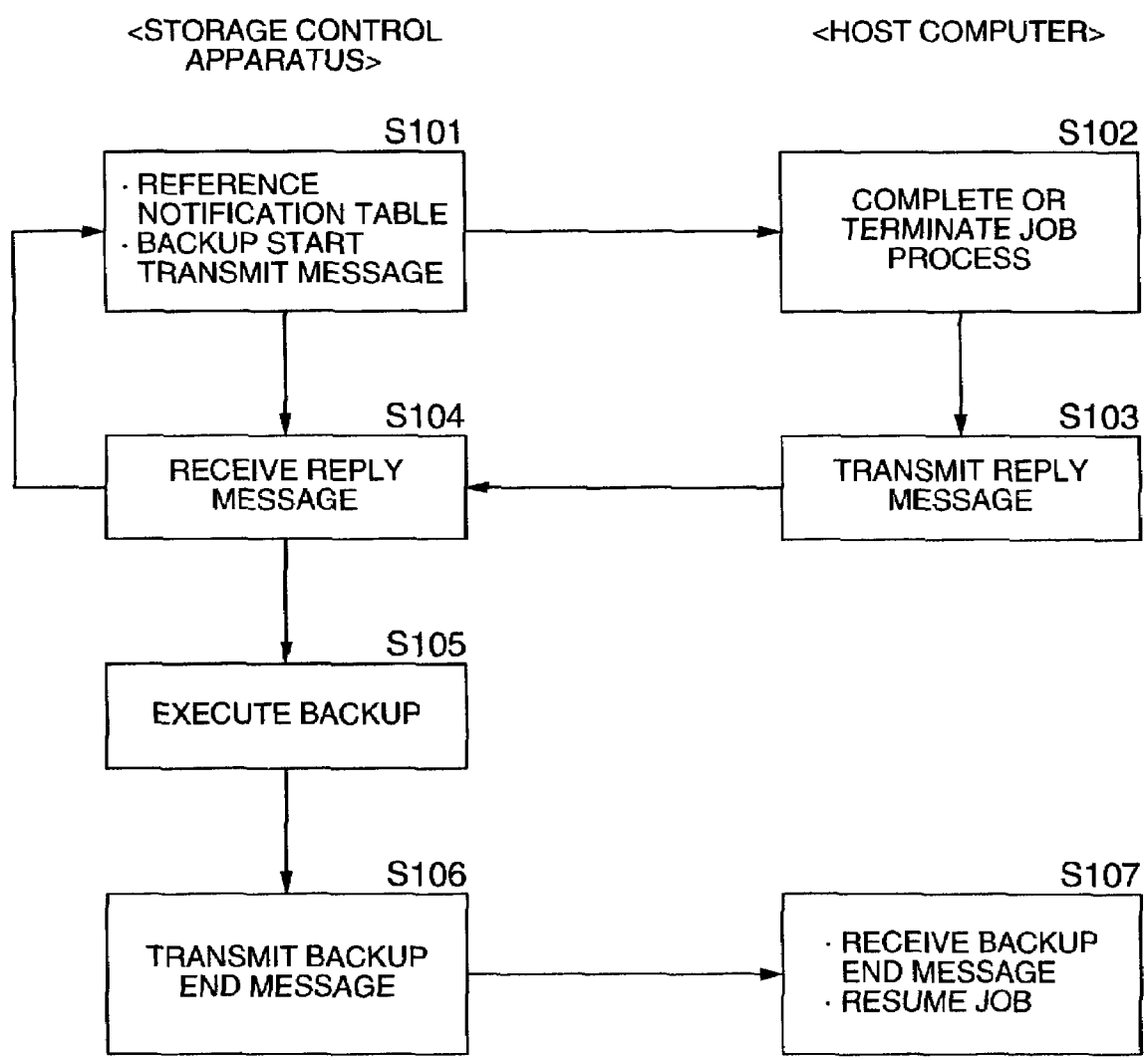
FIG. 2 is a flowchart explaining processes performed in the storage system when executing a backup process according to an embodiment of the present invention.

FIG. 2 is a flowchart explaining a process performed in the storage system during execution of the backup process. Scheduling of the backup is performed, for example, by an operator operating the management terminal 50. It should be noted that in the explanation below, the backup process is automatically executed by the scheduler. However, it is also possible that the backup process is started by operation of the management terminal 50 by the operator.

When the start time of the backup process scheduled has come, the storage control apparatus 10 transmits a backup start message that a backup process is to be started via the LAN 30 to the host computer 20 which may execute a job transmitting a data I/O request to the storage control apparatus 10 (S101).

Here, the possibility of transmission of a data I/O request is judged by the operator, for example. Moreover, as a result, a list of the selected host computers 20 is stored in the notification table of the control memory 11. It should be noted that the host computers 20 to be registered in the notification table may be selected not only by the operator but also automatically selected by the storage control apparatus 10 using a predetermined algorithm in accordance with parameters stored in the control memory 11 and information fetched by the storage control apparatus 10 from the host computer 20 via the LAN 30. Moreover, a user of the host computer 20 may operate an application program executed on the host computer 20 and registers the host computer 20 on the notification table.

The data I/O request is for example, a data write in request and a data read out request or may be only the data write in request or only the data read out request. Depending on whether the aforementioned process in the storage control apparatus 10 interrupted by the request is affected by the request, only the data write in request is inhibited, or only the data read out request is inhibited, or both of them are inhibited.

Figures 3, 4:
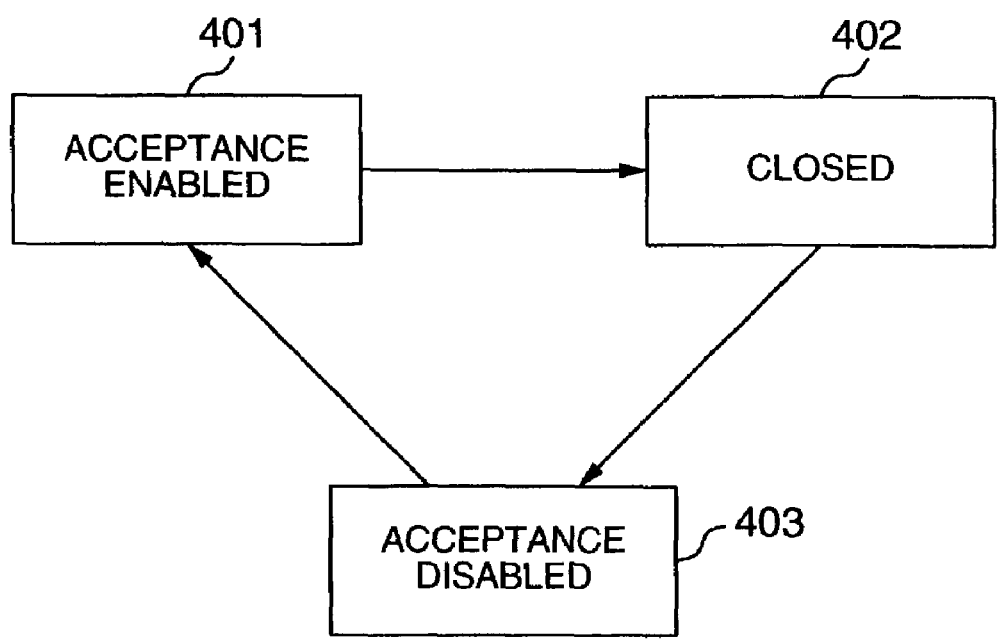
FIG. 3 shows a notification table according to an embodiment of the present invention.
FIG. 4 shows state transition of the host computer according to an embodiment of the present invention.

FIG. 3 shows an example of a notification table. A volume ID of a storage volume where backup is to be performed is related with a host computer ID specifying the host computer 20 as a notification destination and a port ID. Here, the storage volume is a storage region theoretically edited on a storage region provided by a storage device 13. For example, when the storage device 13 is used in the RAID manner, a stripe corresponds to the storage volume. Moreover, the port ID is an ID assigned for each route on the LAN to the host computer 20.

Upon reception of the backup start message, the host computer 20 checks its job execution state to determine whether a process for the NFS is being executed or may be executed. When a job is executing such a process or a job which may execute such a process is being executed, the process of the job is completed or terminated.

It should be noted that, without completing the entire job, it is possible to selectively complete a job which is executing or may execute a process for the NFS. In short, it is necessary to complete or terminate a process which may affect the backup process executed in the storage control apparatus 10. It should be noted that acceptance of a new job may be stopped or acceptance itself is performed but the job is not executed and queued in the processing-waiting queue.

The host computer 20 completes or terminates a process affecting the backup process (S102) and when there becomes no possibility of transmission of a data I/O request affecting the backup process, the host computer 20 transmits a reply message notifying that to the storage control apparatus 10 (S103). It should be noted that this reply message contains at least an ID of the host computer 20 which has transmitted the reply message.

The storage control apparatus 10 receives the reply message transmitted from the host computer 20 (S104). The storage control apparatus 10 stores the ID of the host computer 20 described in the reply message and monitors whether reply message has been received from all the host computers described on the notification table.

When the storage control apparatus 10 confirms that reply messages have been received from all the host computers 20 registered in the notification table, the storage control apparatus 10 executes the backup process (S105). Here, during the backup, it is guaranteed that no data I/O request is transmitted from the host computer 20 to affect execution of the aforementioned process. Accordingly, there is no danger of backup of data which has not been updated (for example, one record of a database is being updated) and the content of the backup data (such as a content of a record) and a time stamp can be guaranteed.

When the backup process is complete, the storage control apparatus 10 transmits a backup end message to the host computer 20 (S106).

On the other hand, upon reception of the aforementioned message (S107), the host computer 20 resumes the job which has been terminated and resumes acceptance of a job when job acceptance has been stopped. Moreover, when a job is queued, the job is executed. Thus, the host computer 20 returns to the normal operation state.

More Specific Embodiment

The processing related to the execution of the backup process will be described in more detail.

[State of Host Computer]

FIG. 4 shows a state transition of the host computer upon execution of the aforementioned process. As a whole shown here, the host computer 20 changes its state to "acceptance enabled" (401), "closed" (402) and "acceptance disabled" (403) successively. Here, the "acceptance enabled" (401) is a normal operation state, i.e., a data I/O request is normally transmitted from the host computer 20 to the storage control apparatus 10. In the "acceptance enabled" state (401), when a message notifying a start of a process such as a backup is received from the storage control apparatus 10, the host computer 20 transitions to the "closed" state (402).

For example, the "closed" state (402) corresponds to a state when the aforementioned job processing is completed or terminated. When the process affecting the aforementioned process is completed or terminated and there is no possibility of transmission of a data I/O request affecting the process, the host computer 20 transitions to the "acceptance disabled" state (403).

While the host computer 20 is in this "acceptance disabled" state (403), the aforementioned process is executed in the storage control apparatus 10. When the process is completed and a backup end message is received from the storage control apparatus 10, the host computer 20 again returns to the "acceptance enabled" state (401).

[Process for Completing a Job]

Next, with reference to the flowchart of FIG. 5, explanation will be given on a processing for completing a job by the host computer 20 when the aforementioned backup start message is received. It should be noted that here explanation will be given on a case the job is completed but the job need not always be have to be completed. In short, the job should be in a state not transmitting a data I/O request affecting the backup process from the host computer 20 to the storage control apparatus 10.

Figure 5:
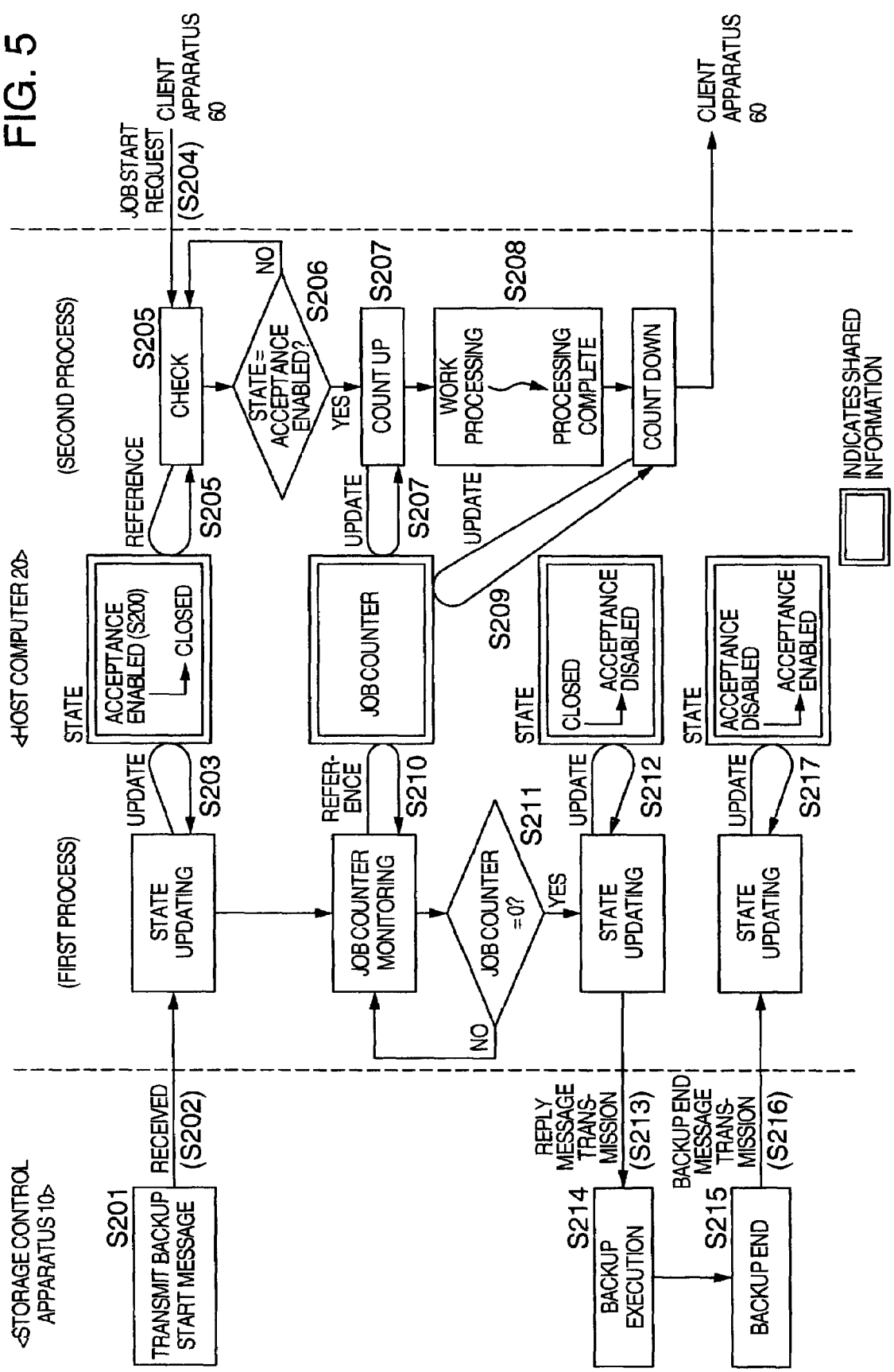
FIG. 5 is a flowchart explaining a processing such as a job completion by the host computer according to an embodiment of the present invention.

Here, as shown in FIG. 5, the host computer 20 has two independent processes; a first process and a second process. Each of the processes share the states of the host computer 20 and a job counter and references and updates the states. The job counter is a counter to store a count of jobs which may transmit a data I/O request to the storage control apparatus 10 among the jobs being executed by the host computer 20.

It is assumed that the host computer is in the "acceptance enabled" state (401) as the initial state. Firstly, the job counter is cleared to zero (S200). In this state, a backup start message is transmitted from the storage control apparatus 10 to the host computer 20 (S201). On the other hand, the host computer 20 receives the message (S202) and updates the state of the host computer 20 from the "acceptance enabled" (401) to the "closed" (402) as the first process (S203).

When the host computer is normal operation state, i.e., in the "acceptance enabled" state (401), the host computer 20 accepts a job start request in accordance with a request from an application program being executed by the host computer 20, the OS, or a client apparatus 60 connected via the LAN. When the host computer 20 accepts a new job, the host computer 20 checks the new job as the second process (S205), it is confirmed that the host computer 20 is in the "acceptance enabled" state (401) (S206), and the jog counter value is incremented by one (S207). Moreover, each time an accepted job is completed (S208), the job counter value is decremented by one (S209). It should be noted that when the host computer 20 is in the "closed" state (402) and the "acceptance disabled" state (403), for the request, the job is interrupted or queued in a process waiting queue.

Here, the host computer 20, upon reception of the backup start message (S201), as a first process, references the job counter state in real time and monitors whether jobs being executed are complete (S210). And check is made to determine whether the job counter value is 0 (S211). When all the jobs are complete, the host computer 20 updates its state to the "acceptance disabled" state (403)(for example, modifies the status indicating the state) (S212) and transmits a reply message notifying that there is no possibility of transmission of a data I/O request affecting the process of the storage control apparatus 10 (S213). The storage control apparatus 10 receives the reply message and executes the backup process (S214).

When the backup process is complete (S215), the storage control apparatus 10 transmits the aforementioned backup end message to the host computer (S216). Upon reception of the backup end message, the host computer 20 updates its state from the "acceptance disabled" state (403) to the "acceptance enabled" state (401) (S217). Thus, the host computer 20 returns to the normal operation state.

It should be noted that explanation has been given on a case that the process executed in the storage control apparatus 10 is a backup process but the process may be other processes such as batch processing for data extraction to a data ware house.

According to the present invention, when executing a process in the storage control apparatus which process requires stop of a data I/O request from the host computer, a data I/O request from the host computer can automatically be controlled.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of controlling a storage control apparatus connected and capable of communication to a plurality of host computers via communication means, receiving data I/O requests transmitted from the plurality of host computers, and performing a data I/O process corresponding to the requests to a storage device connected to the storage control apparatus, the method comprising steps of:

transmitting a notification message notifying a start of a process from the storage control apparatus to the plurality of host computers when the storage control apparatus executes a process required for a control of data I/O requests transmitted from the plurality of host computers; and executing the process by the storage control apparatus after receiving from all of the plurality of host computers reply messages in response to the notification messages, wherein the data I/O request is transmitted to the storage control apparatus in a communication system such that the storage control apparatus has no knowledge of the processing state at which the data I/O request is transmitted from each of the plurality of host computers, wherein the storage control apparatus includes a file system and the data I/O request is a request instructing a data I/O on file basis, and wherein the storage control apparatus identifies completion of the set of I/O requests necessary for an application program on each of the plurality of host computers, in response to the reply message from each of the plurality of host computers.

2. The method as claimed in claim 1, wherein the data I/O request transmitted from the plurality of host computers are controlled in such a manner that each of the plurality of host computers transitions to a disabled state thereby preventing transmission of another data I/O request, in such a manner that each of the plurality of host computers does not transfer an uncompleted part of I/O requests in the set of I/O requests necessary for application program running on each of the plurality of host computers, to the storage control apparatus.

3. The method as claimed in claim 1, wherein the reply message notifies that each of the plurality of host computers does not transmit the data I/O request to the storage control apparatus during execution of the process by the storage control apparatus, wherein reply message is sent to the storage control apparatus based on decision determined by each of the plurality of host computers, wherein the decision includes determination whether set of I/O requests necessary for an application program on each of the plurality of host computers, is completed or not.

4. The method as claimed in claim 1, wherein the reply message includes that a data I/O process performed corresponding to the data I/O request is in a committed state during execution of the process by the storage control apparatus, wherein reply message is sent to the storage control apparatus based on decision determined by each of the plurality of host computers, wherein the decision includes determination whether set of I/O requests necessary for an application program on each of the plurality of host computers, is completed or not.

5. The method as claimed in claim 1, wherein the file system is Network File System and the data I/O request is a Network File System command, wherein the storage apparatus identifies completion of the set of Network File System commands necessary for an application program on each of the plurality of host computers.

6. The method as claimed in claim 1, wherein the process is fetching backup of the data stored in the storage device by the storage control apparatus, wherein the storage control apparatus identifies completion of the set of I/O requests necessary for an application program on each of the plurality of host computers, in response to the reply message form each of the plurality of host computers.

7. The method as claimed in claim 1, wherein the storage control apparatus stores information specifying each of the plurality of host computers as the transmission destination of the message notifying the execution start and the message notifying the execution start is transmitted to the plurality of host computers corresponding to the information, wherein the storage control apparatus identifies completion of the set of I/O requests associated with an application program on each of the, plurality of computers.

8. The method as claimed in claim 1, wherein when the process is complete, the storage control apparatus transmits to each of the plurality of host computers a message notifying the completion of the process.

9. A storage control apparatus connected and capable of communication to a plurality of host computers via communication means, receiving data I/O requests transmitted from the plurality of host computers, and performing a data I/O process corresponding to the requests to a storage device connected to the storage control apparatus, the apparatus comprising:

means for receiving data I/O requests from each of the plurality of host computers via the communication means to execute a data I/O process corresponding to those requests;

means for transmitting a notification message notifying an execution start of a process when executing a process requiring control of the data I/O request; and means for executing the process after receiving from all of the plurality of the host computers reply messages in response to the notification message, wherein the data I/O request is transmitted to the storage control apparatus in a communication system such that the storage control apparatus has no knowledge of the processing state at which the data I/O request is transmitted from each of the plurality of host computers, wherein the storage control apparatus includes a file system and the data I/O request is a request instructing a data I/O on file basis, and wherein the storage control apparatus identifies completion of the set of I/O requests necessary for an application program on each of the plurality of host computers, in response to the reply message from each of the plurality of host computers.

10. A computer readable program stored on a storage control apparatus connected and capable of communication to a plurality of host computers via communication means, receiving data I/O requests transmitted from the plurality of host computers, and performing a data I/O process corresponding to the request to a storage device connected to the storage control apparatus, the program comprising:

means for receiving data I/O requests from the plurality of host computers via the communication means to execute a data I/O process corresponding to those requests;

means for transmitting a notification message notifying an execution start of a process when executing a process requiring control of the data I/O request; and means for executing the process after receiving from all of the plurality of host computers reply messages in response to the notification message, wherein the data I/O request is transmitted to the storage control apparatus in a communication system such that the storage control apparatus has no knowledge of the processing state at which the data I/O request is transmitted from each of the plurality of host computers, wherein the storage control apparatus includes a file system and the data I/O request is a request instructing a data I/O on file basis, and wherein the storage control apparatus identifies completion of the set of I/O requests necessary for an application program on each of the plurality of host computers, in response to the reply message from each of the plurality of host computers.

* * * * *